United States Patent [19]

Isoda et al.

[11] Patent Number: 5,267,347
[45] Date of Patent: Nov. 30, 1993

[54] INFORMATION PROCESSING ELEMENT

[75] Inventors: Satoru Isoda, Amagasaki; Yoshio Hanazato, Hyogo; Satoshi Ueyama, Hyogo; Hiroaki Kawakubo, Hyogo; Ken-Ichi Tanaka, Hyogo; Mitsuo Maeda, Hyogo, all of Japan

[73] Assignee: Mitsubishi Denki Kabushiki Kaisha, Tokyo, Japan

[21] Appl. No.: 946,259

[22] Filed: Sep. 16, 1992

Related U.S. Application Data

[63] Continuation of Ser. No. 544,760, Jun. 27, 1990, abandoned.

[30] Foreign Application Priority Data

Jun. 28, 1989 [JP] Japan .................. 1-167768
Jun. 28, 1989 [JP] Japan .................. 1-167770

[51] Int. Cl.$^5$ ........................ G06G 7/16; H01L 31/08
[52] U.S. Cl. ........................ 395/25; 364/602
[58] Field of Search ............ 395/24, 25; 364/807, 364/602; 307/201

[56] References Cited

U.S. PATENT DOCUMENTS

| | | | |
|---|---|---|---|
| 3,599,009 | 8/1971 | Parmentier et al. | 395/24 |
| 3,717,773 | 2/1973 | Parmentier et al. | 395/24 |
| 4,760,437 | 7/1988 | Denker et al. | 395/25 |
| 4,782,460 | 11/1988 | Spencer | 395/24 |
| 4,945,257 | 7/1990 | Marrocco, III | 395/24 |
| 4,988,891 | 1/1991 | Mashiko | 395/25 |
| 4,999,688 | 3/1991 | Hara et al. | 357/19 |
| 5,003,360 | 3/1991 | Okada et al. | 357/22 |
| 5,008,833 | 4/1991 | Arganat et al. | 395/25 |
| 5,010,512 | 4/1991 | Hartstein et al. | 395/24 |
| 5,056,897 | 10/1991 | Akiyama et al. | 359/72 |
| 5,062,693 | 11/1991 | Beratan et al. | 359/241 |
| 5,122,227 | 6/1992 | Ott | 395/24 |

OTHER PUBLICATIONS

C. D. Kornfield et al, "An Optically Programmed Neural Network," IEEE International Conference on Neural Networks, San Diego, Calif., Jul. 24-27, 1988, pp. II-357-364, IEEE, New York, U.S.

Mitsubishi, "Biodevice Uses Protein Conductivity," Nikkel High Tech Report, vol. IV, No. 14, May 22, 1989, p. 11.

B. W. Lee et al, "An Investigation on Local Minima of Hopfield Network for Optimization Circuits," IEEE International Conference on Neural Networks, San Diego, Calif., Jul. 24-27, 1988, pp. I/45-51, IEEE, New York, U.S.

C. A. Mead et al, "A Silicon Model of Early Visual Processing," Neural Networks, vol. 1, No. 1, 1988, pp. 91-97.

Primary Examiner—Michael R. Fleming
Assistant Examiner—George Davis
Attorney, Agent, or Firm—Wolf, Greenfield & Sacks

[57] ABSTRACT

An information processing element for processing information with a function of neural network includes a semiconductor integrated circuit element portion comprising a plurality of neuron circuit regions constituting a neuron function among the neural network function, a molecular film element having a light-electricity function, provided on the circuit element portion, and the combination between the plurality of neurons is realized by utilizing a photoconductivity property of the molecular film element.

20 Claims, 6 Drawing Sheets

INFORMATION PROCESSING ELEMENT

This application is a continuation of application Ser. No. 07/544,760, filed Jun. 27, 1990, now abandoned.

FIELD OF THE INVENTION

The present invention relates to an information processing element for conducting processing of information, having a neuron function or a neural network function, namely an information processing ability, such as learning ability, the sense of vision, the sense of smell, the sense of taste, which are possessed by a brain which is realized technologically with a hint suggested by a neuron as a fundamental element of a brain, a structure of a neural network obtained as the juncture thereof, and an information processing mechanism. More particularly, the present invention relates to an information processing element capable of writing in the synapse intensity matrix ($T_{ij}$) representing the wiring state between neuron in a neural information processing from the outside by light.

The present invention also relates to a high speed visual information processing element having also an image sensor portion for capturing visual image and a neural information processing function portion which parallely processes the signals and capable of giving the visual image signal from the image sensor portion parallely to the neural information processing function portion.

BACKGROUND OF THE INVENTION

FIG. 1 is a diagram showing a construction of an integrated circuit of an information processing element simulating a neural network disclosed in "J. J. Hopfield et al., Science, 233, p 625 (1986)". In FIG. 1, reference numeral 1 designates a constitutional unit of a neuron, reference numeral 2 designates a resistor as a constitutional element of a neuron, reference numeral 3 designates a capacitor as a constitutional element of a neuron, reference numeral 4 designates an amplifier as a constitutional element of a neuron, reference numeral 5 designates a $T_{ij}$ representing the degree of interaction between neurons, reference numeral 6 designates an input line to the neuron, and reference numeral 7 designates an output line from the neuron.

The device will operate as follows.

The information which was input by the external signal is input to the neuron 1 through the input line 6 as an input of an information processing element, as an electric current for example. The input is junctioned with the output line 7 of the other neuron via the $T_{ij}$ 5 before it is input to the neuron 1, and the input current of initial stage is input to the neuron 1 influenced by these. The $T_{ij}$ is generally produced of a fixed resistor, and when an information processing element is produced, it is produced at the same time in the element. In neuron 1, the current value is converted into a voltage by resistor 2 and capacitor 3, and is amplified by amplifier 4, to output a signal of firing ($+V$) or a signal of suppression ($-V$). When the output of the neurons are made stable as the whole network, an object information which is considered to be most appropriate is obtained from the output value.

Since, the prior art information processing element shown in FIG. 1 is constituted as such, the neuron 1, the wiring portions 6 and 7, and $T_{ij}$ have to be previously produced in the element, and there are problems such that the number of neurons which can be integrated in the element is small and it is impossible to change the $T_{ij}$ to a different value.

FIG. 2 shows a stereoscopic resistor circuit for calculating the optical flow disclosed in "K. Koch et al., Neural Computers, Berlin, 1988, p.101". In FIG. 2, reference numeral 11 shows an equivalent circuit when a light-electricity converter such as photodiode is subjected to a light irradiation. Reference numeral 12 designates a power supply existing in the equivalent circuit, reference numeral 13 designates a capacitor existing in the equivalent circuit, reference numeral 14 designates a resistor existing in the equivalent circuit, reference numerals 15 and 16 designate contact points of the stereoscopic resistor circuit, reference numeral 17 designates a resistor connecting between the contact points of the upper layer and the lower layer, reference numeral 18 designates a resistor connecting the respective contact points in the surface of upper layer and lower layer, and reference numeral 19 designates a switch provided in the resistor 18.

The operation of the circuit shown in FIG. 2 will be described.

The visual information of the object obtained by the photodiode 11 is input to the respective contact points 15 and 16 of the stereoscopic resistor circuit at the same time with some time interval. The voltage variation in the respective contact points 15 and 16 based on the variation of the light signal generated by the movement of the object disturbs the system of the circuit which has been stable thereby to transit to a new stable state. From the voltage values of the respective contact points 15 and 16 which have reached the stable state, velocity vectors of two-dimensional of X and Y directions are obtained. However, because the contour of the object becomes unclarified in this case, a switch 19 is provided so that a contour is produced at a reasonable position.

In the circuit shown in FIG. 2, since it is constituted as described above, it is difficult to produce the image sensor portion such as photodiode and the image signal processing portion in the same element, and to transmit the image signal in parallel, and further, it is difficult to construct a stereoscopic resistor circuit such as optical flow in the prior art semiconductor element.

SUMMARY OF THE INVENTION

The present invention is directed to solving the abovedescribed problems and has its object to provide an information processing element capable of enhancing the degree of integration of neurons and capable of easily rewriting the value of $T_{ij}$.

Another object of the present invention is to provide a visual information processing element in which the image sensor portion and the signal processing portion are produced in the same element, and the signal transmission between the image sensor portion and the signal processing portion having a neural information processing function and conducting a parallel information processing are conducted parallely.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

An information processing element in accordance with the present invention includes a semiconductor integrated circuit element portion comprising a plurality of neuron circuit regions constituting a neuron function among the neural network function, a molecular film element having a light-electricity function, provided on the circuit element portion, and the combination between the plurality of neurons is realized by utilizing a photoconductivity property of the molecular film element.

An information processing element in accordance with the present invention includes a semiconductor integrated circuit element portion comprising a matrix in N×M of neuron circuit regions, a first heterojunction molecular film having a light-electricity function, provided on the semiconductor integrated circuit element portion, 2N pieces of first semi-transparent wirings provided on the first molecular film in the transverse direction so as to transverse on the output electrodes or input electrodes of the N pieces of neuron circuit regions, a second heterojunction molecular film having a light-electricity function, provided on the first molecular film on which the wiring is provided, 2M pieces of second semi-transparent wirings provided on the second molecular film in the longitudinal direction so as to transverse on the output electrodes or input electrodes of the N pieces of neuron circuit regions and to transverse two pieces for one neuron circuit region, and light is irradiated to the cross point between the output electrode or the input electrode of the neuron circuit region and the first semi-transparent wiring and to the cross point between the first semi-transparent wiring and the second semi-transparent wiring so that the juncture intensity ($T_{ij}$) between the N×M pieces of neuron circuit regions is controlled.

Therefore, it is possible to write in the $T_{ij}$ matrix arbitrarily, and also it reduces the wiring number, a high efficiency information processing is accomplished and the integration density of neuron is enhanced.

A visual information processing element in accordance with the present invention includes a semiconductor integrated circuit element portion comprising a plurality of neuron circuit regions constituting a neuron function among the neural network function, and a molecular film element having a light-electricity function, provided on the circuit element portion. The molecular film element includes a $T_{ij}$ input portion to which the juncture intensity state ($T_{ij}$) between the plurality of neuron circuit regions is written in by light to realize inter between neuron wiring function, and an image input portion realizing a censor function of visual image corresponding to one picture element per one neuron.

A visual information processing element in accordance with the present invention includes a semiconductor integrated circuit element portion comprising a matrix in N×M of neuron circuit regions, a first heterojunction molecular film having a light-electricity function, provided on the semiconductor integrated circuit element portion, 2N pieces of first semi-transparent wirings provided on the first molecular film in the transverse direction so as to transverse on the output electrodes or input electrodes of the M pieces of neuron circuit regions, a second heterojunction molecular film having a light-electricity function, provided on the first molecular film on which the wiring is provided, 2M pieces of second semi-transparent wirings provided on the second molecular film in the longitudinal direction so as to transverse on the output electrodes or input electrodes of the N pieces of neuron circuit regions and to transverse two pieces for one neuron circuit region and light is irradiated to the cross point between the output electrode or the input electrode of the neuron circuit region and the first semi-transparent wiring and to the cross point between the first semi-transparent wiring and the second semi-transparent wiring so that the juncture intensity ($T_{ij}$) between the N×M pieces of neuron circuit regions is controlled.

Therefore, it is possible to have a function of image sensor and a function of a neuron in the same element and further capable of writing the $T_{ij}$ signal from the outside. As a result, the visual image signal from the image sensor portion can be handed out in parallel to the neuron which is a neural information processing function portion, and further, a neural information processing having a high degree of $T_{ij}$ function is enabled to realize a super high speed visual information processing element.

DETAILED DESCRIPTION OF THE PREFERRED EMBODIMENT

An embodiment of the present invention will be described in detail with reference to the drawings.

Figure 1:
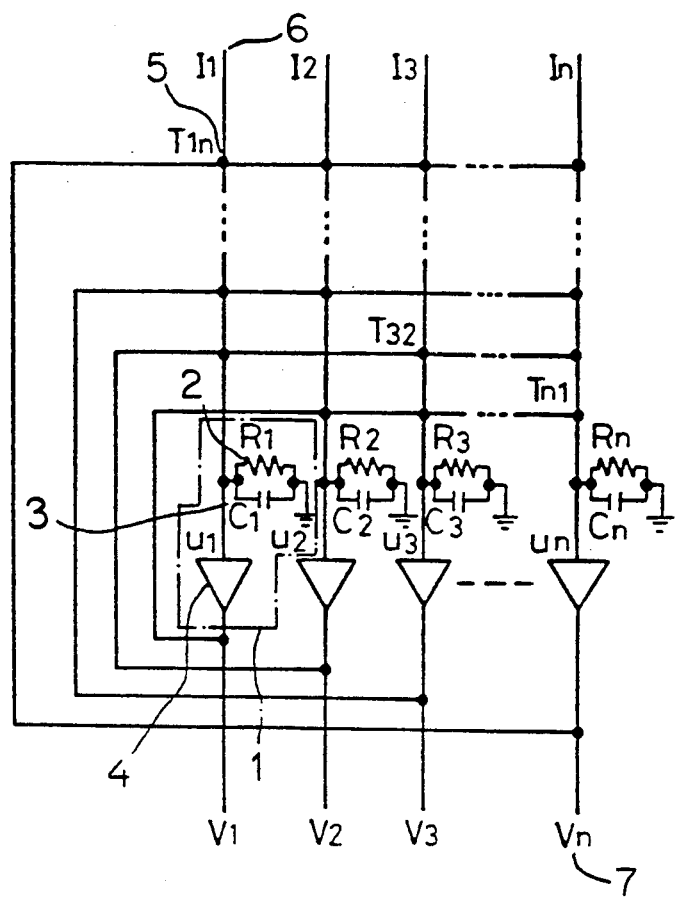
FIG. 1 is a diagram showing a construction of an integrated circuit of an information processing element according to a prior art.
Figure 2:
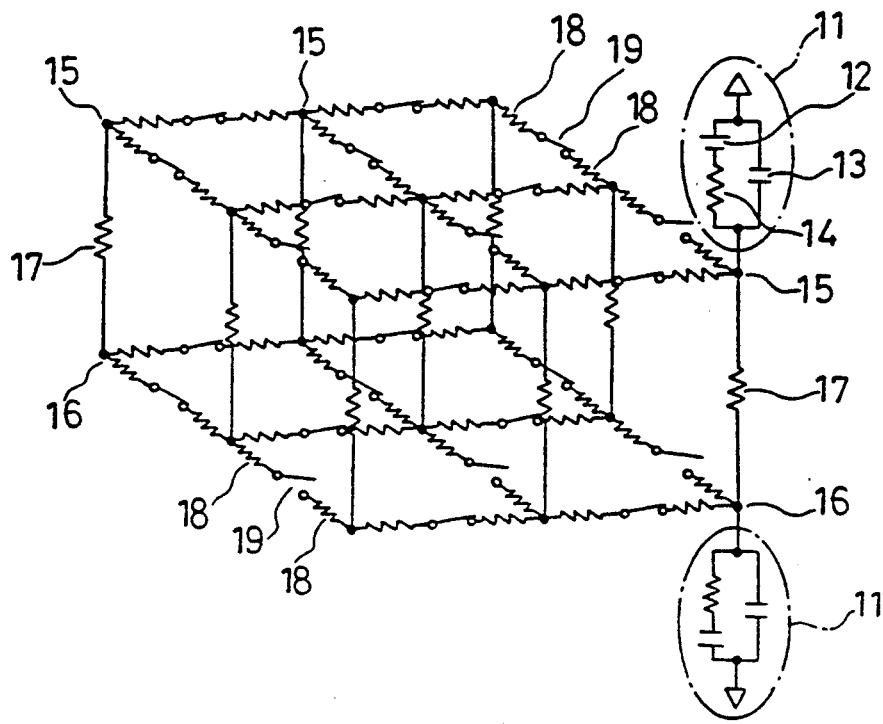
FIG. 2 shows a stereoscopic resistor circuit for calculating the optical flow according to a prior art.
Figure 3:
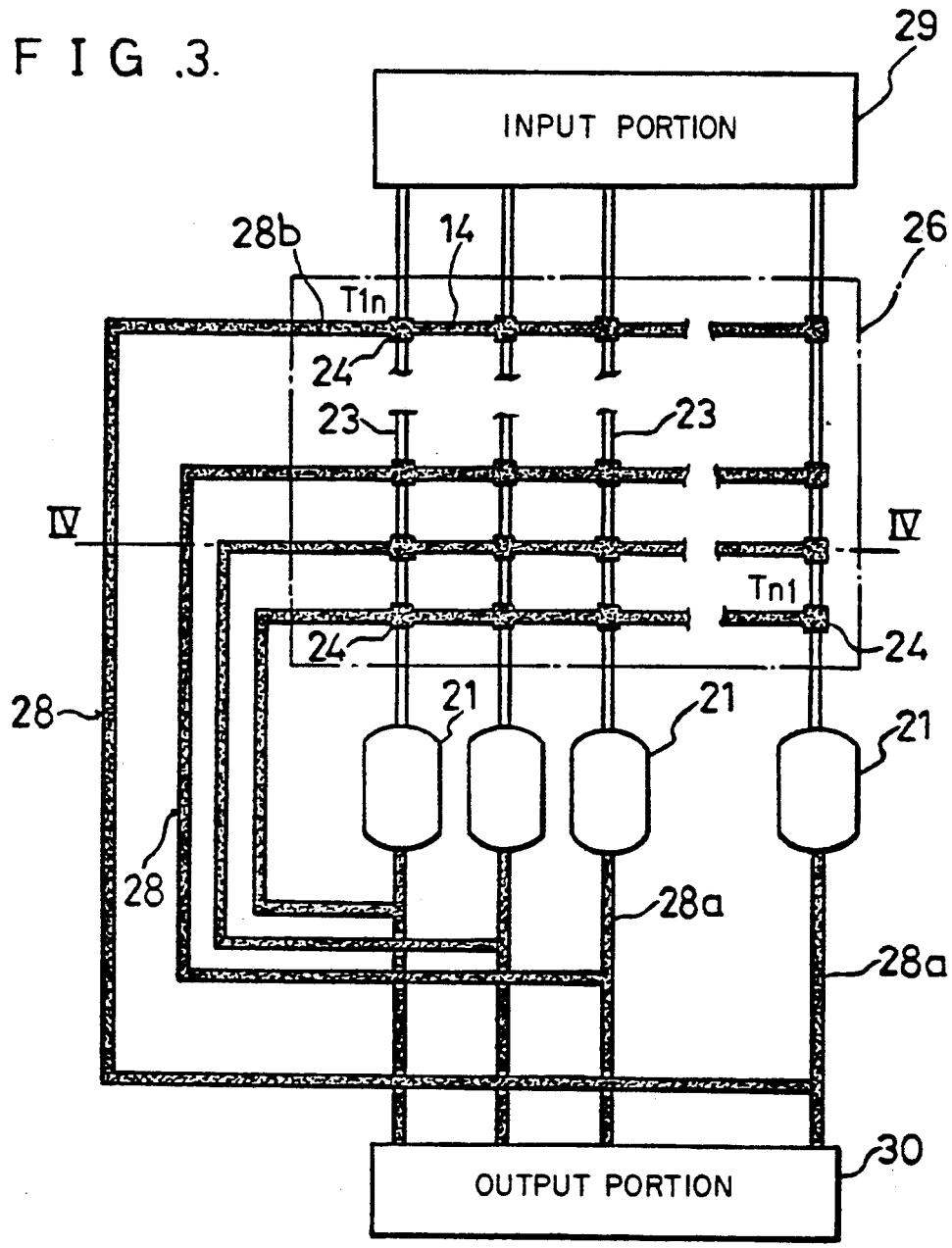
FIGS. 3 and 4 show a construction of an information processing element according to a first embodiment of the present invention.
Figure 4:
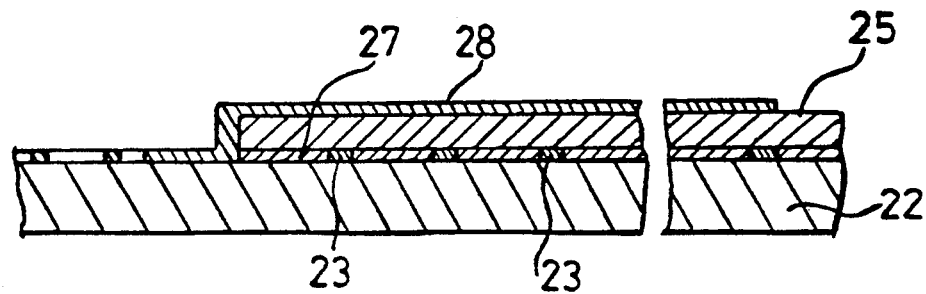

FIGS. 3 and 4 show a construction of an information processing element according to a first embodiment of the present invention. In these figures, reference numeral 21 designates a neuron constituted by an analogue electronic circuit simulating the neuro operation of a living body. Similarly as the neuron shown in FIG. 1, this neuron 21 may be constituted by the resistor, capacitor, and an amplifier, and using an ordinary integrated circuit technique, this is produced arranged in one column in the transverse direction in the figure on the surface of the substrate 22 comprising a Si semiconductor. Herein, the electrical separation between the neurons may be a separation of pn junction between the substrate 22, and may be an oxide film separation. Reference numeral 23 designates an input wiring parallely arranged on the surface of the substrate 22 via an insulating film (not shown), and one end thereof is connected to the input node of the neuron 21. This is produced by a vacuum deposition of aluminum and has a wiring portion of several 10s to several 100s microns width having a thickness of about 1 microns (0.1 micron to several microns) and a synapse juncture portion of a quadrangle configuration of 10 microns to 1 mm constituting synapse juncture 24. Reference numeral 25 designates a molecular film produced in the synapse juncture region 26 shown by the dotted lines in FIG. 3, in which the electric resistance of the irradiation portion changes in accordance with the intensity of incident light, for example, the electric resistance is lowered by carriers (electrons or holes) controlling the electric conductivity which are generated by the light irradiation, and this molecular film is produced on the surface of the substrate 22 via an insulator 27 and is produced in contact with the surface of the input wiring 23. For example, this is produced by laminating several layers of polyphirin derivative by Langmuir-Blodgett's technique disclosed in "K. B. Blodgett, Journal of American Chemical Society, Vol. 57, p. 1007, (1935)" and flavin derivative is laminated in several layers thereon thereby to produce a hetero-molecular-junction and it has a thickness of several 10s angstroms to 1 micron. Reference numeral 28 designates an output wiring having an output portion 28a one end of which is connected to the output node of the neuron, produced on the surface of the substrate 22 via an insulating film (not shown), and a feedback portion 28b having a synapse juncture portion at a position confronting to the synapse juncture portion of the input wiring 23 produced in contact with the surface of the molecular film 25 produced extending from the output portion 28a, and this is produced by vacuum deposition of aluminum to a thickness of about 1 micron (0.1 micron to several microns) which is semi-transparent to the light, the width thereof is made about several 10s to several 100s microns, and the synapse juncture portion is produced in a quadrangle configuration of 10 microns to 1 mm. The synapse juncture $T_{ij}$ 24 is constituted by the synapse juncture portion of the input wiring 23, the synapse juncture portion of the output wiring 28, and the molecular film 25 existing between the both wirings 23 and 28, and these are produced in a number of the second power of the number of neuron 21, and the output wiring 28s of the respective neurons 21 are connected to the input wiring 23 of all the neurons 21 by the synapse juncture $T_{ij}$ 24. Reference numeral 29 designates an input portion for giving input information to the input wiring 23, produced on the surface of the substrate 22, and for example, it may be an input terminal respectively connected to the other end of the input wiring 23, and further, it may be one which once stores or latches the serial input information with receiving the serial input information from the outside by one input terminal and gives the input information to the respective input wirings 23 in parallel. Reference numeral 30 designates an output portion for introducing the output information from the output wiring 28 to the outside, produced on the surface of the substrate 22, and for example, it may be an output terminal connected to the other end portion of the output portion 28a of the output wiring 28, and it may be one which once stores or latches the parallel output information from the output wiring 28 and outputs the same as a serial output information to the outside.

A description is given of the production method of this first embodiment.

First of all, a neuron 21 which is constituted by an analogue electronic circuit simulating the neuron operation of a living body is produced arranged on one array in the transverse direction on the surface of the substrate 22 utilizing an integrated circuit fabrication technique, and if necessary, a circuit element of the input portion 29 and the output portion 30 are produced. Next, an insulating film comprising such as an oxide film is produced on the surface of the substrate 22 including this neuron 21, and after a contact hole is produced at the input node of the neuron 21, an input wiring 23 is produced on the integrated circuit by vacuum deposition of aluminum. The surface of the integrated circuit where the wiring 23 is not produced is flattened by the insulating film 27 such as $SiO_2$. Next, on a wafer on which an integrated circuit constituting such as neuron 21 and the input wiring 23 are produced, polypherin derivative are laminated in a several layers by Langmuir-Blodgett's technique, and subsequently, flavin derivative are laminated in several layers thereon thereby to produce a molecular film 25 having a hetero-molecular-junction.

Next, an output wiring 28 is produced by using vacuum deposition of metal such as aluminum so as to overlay on the molecular film 25 at the synapse juncture $T_{ij}$ portion 24. Then, metal is deposited to be semi-transparent so that the light transmit through the molecular film portion at this $T_{ij}$ portion.

A description is given of the operation of the first embodiment.

In a neural network, the input signal input to one neuron is coupled with the output signal of the other neuron other than the neuron until it is input to the neuron, and influences are affected on the input state of the neuron. However, the outputs of all the neurons do not necessarily affect influence on one neuron. When the manner in which the output of some neuron affect influences on the input of some neuron is determined in accordance with the information to be processed, the input information can be processed efficiently at high speed. The synapse juncture $T_{ij}$ 24 of the first embodiment utilizes the photoconductivity of the molecular film 25 and by that the light is irradiated, the output signal of the neuron 21 are transmitted. In other words, by that the light is irradiated to the synapse juncture 24, carriers are generated at the molecular film 25 of the irradiation portion of the light and the electric conductivity of the molecular film 25 is lowered thereby to conduct the output wiring 28 on the molecular film 25 and the input wiring 23 existing therebelow, and therefore by that the pattern to which light is irradiated is input to the matrix portion of the synapse juncture 24 as the signal of matrix, an information processing having a high efficiency as described above is realized. Furthermore, the synapse juncture 24 can control the current flowing between the input wiring 23 and the output wiring 28 by the intensity of light. In other words, the resistance of the molecular film 25 in the synapse juncture $T_{ij}$ 24 can be changed by the intensity of the light, and by controlling the intensity of the light to other than the digital pattern of ON-OFF of the matrix as the signal to the synapse juncture 24, an information processing having a further high efficiency than in a case where binary is used is enabled. Furthermore, since the $T_{ij}$ pattern is produced by writing by light as described above, the rewriting is enabled and an information processing of higher level than the case where $T_{ij}$ is fixed is enabled.

By controlling such that, the $T_{ij}$ pattern and the $T_{ij}$ resistance vary in accordance with the output signal, it is possible to add the learning function to the information processing.

Figure 5:
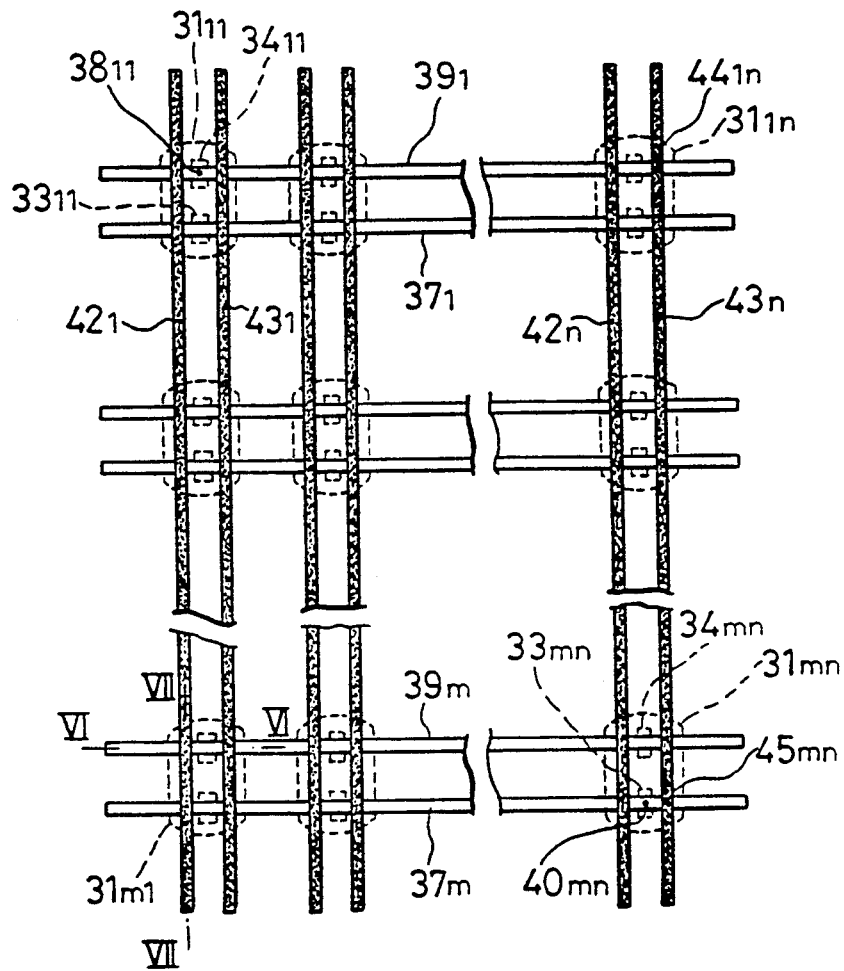
FIGS. 5, 6 and 7 show a second embodiment of the present invention.
Figure 6:
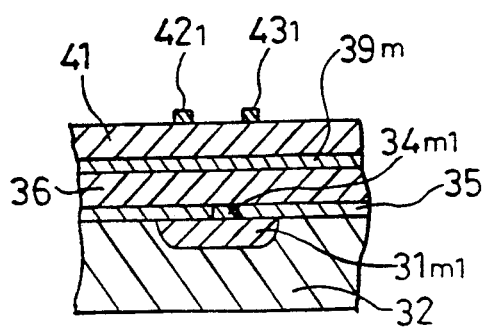
Figure 7:
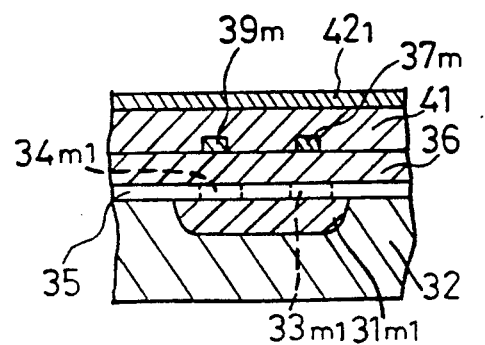

FIGS. 5 to 7 show a second embodiment of the present invention.

In the figures, reference numerals 31-11 to 31-mn designate neurons produced arranged in a matrix of m rows and n columns on the surface of the semiconductor substrate 32, and this neuron has the same constitution as the neuron 21 shown in the first embodiment. Reference numerals 33-11 to 33-mn represent input electrodes connected to the input nodes of the neurons 31-11 to 31-mn, and these are produced by vacuum deposition of aluminum. Reference numerals 34-11 to 34-mn designate output electrodes connected to the output nodes of the neurons 31-11 to 31-mn and these are produced by a vacuum deposition of aluminum. Reference numeral 35 designates an insulating film comprising such as oxide film produced between the input and output electrodes 33-11 to 33-mn, 34-11 to 34-mn on the surface of the substrate 32. Reference numeral 36 designates first molecular film produced in contact with the surface of the insulating film and the surface of the input and output electrodes 33-11 to 33-mn, 34-11 to 34-mn, and these are the same as the molecular film 25 shown in the first embodiment. Reference numerals 37-1 to 37-m designate first input wiring produced in parallel with the respective row in contact with on the surface of the first molecular film 36 arranged confronting to the input electrode produced at the rows corresponding to the rows. These first input wirings are produced by vacuum deposition of aluminum and is made semi-transparent state transmitting the light, and when the light is incident to the juncture portions 38-11 to 38-mn which are portions confronting to the input electrode, and these first input wirings are electrically connected with the input electrodes via a first molecular film 36. Reference numerals 39-1 to 39-m designate first output wirings produced in parallel with each row in contact with on the surface of the first molecular film 36, and arranged confronting to the output electrodes produced at the corresponding rows. These first output wirings are produced by vacuum deposition of aluminum at the same time as the first input wirings 37-1 to 37-m, and when light is incident to the juncture portions 40-11 to 40-mn which are portions corresponding to the output electrodes, these first output wirings are electrically connected with the output electrodes via the first molecular film 36 and transmit the output information to the output portion (not shown). Reference numeral 41 designates a second molecular film produced in contact with the surface of the first molecular film 36, the first input wirings 37-1 to 37-m, and the first output wirings 39-1 to 39-m, and these are the same a the first molecular film 36. Reference numerals 42-1 to 42-n designate second input wirings for transmitting the input information from the input portion (not shown), produced in parallel with each row in contact with the surface of the second molecular film 41. These second input wirings are produced by vacuum deposition of aluminum to be of a semi-transparent state which transmits the light, and when light is incident to the juncture portion which is the portion corresponding to the first input wiring, it is electrically connected with the first input wiring via the second molecular film 41. Herein, if the input information is designed to be directly input to the first input wirings 37-1 to 37-m, the second input wirings 42-1 to 42-n are not necessarily be provided. Reference numerals 43-1 to 43-n designate second output wirings produced in parallel with each column in contact with the surface of the second molecular film 41, and these second output wirings are produced by vacuum deposition of aluminum at the same time as the second input wirings 42-1 to 42-n and when light is incident to the juncture portions 44-11 to 44-mn which are portions confronting to the first output wirings 39-1 to 39-m, and the juncture portions 45-11 to 45-mn which are portions confronting to the first input wirings 37-1 to 37-m, they are electrically connected with the first output wiring and the first input wiring via the second molecular film 41.

A description is given of the production method of the second embodiment.

By using an integrated circuit technique, neurons 31-11 to 31-mn constituted by an analogue electronic circuit simulating the neuron operation of a living body are produced arranged in a matrix of m rows and n columns on the surface of the Si substrate 32. Then, if it is required, a circuit element of the input portion or the output portion may be produced. Next, output electrodes 34-11 to 34-mn and input electrodes 33-11 to 33-mn which are connected with the input nodes and the output nodes of the neurons 31-11 to 31-mn are produced. The surface of the substrate 32 on which the electrode is not produced is flattened by such as insulating film 35. Then, an insulating film 35 is produced on the entire surface of the substrate 32 including a region where an integrated circuit constituting such as neurons 31-11 to 31-mn is produced and a contact hole is produced at a portion corresponding to the input node and the output node of the neurons 31-11 to 31-mn of this insulating film 35, and aluminum is buried in this contact hole to produce input and output electrodes 33-11 to 33-mn, 34-11 to 34-mn. Next, on the surface of the input and output electrodes 33-11 to 33-mn, 34-11 to 34-mn and on the surface of the insulating film 35, a first molecular film 36 having a heterojunction is produced similarly as in the first embodiment by Langmuir-Blodgett's technique. On this first molecular film 36, first input and output wiring 37-1 to 37-m, 39-1 to 39-m comprising semi-transparent aluminum are produced so as to transverse directly above the output electrode 34 of the neuron 31 arranged in the row direction (transverse direction in the figure) and directly above the input electrode 33. Thereafter, a second molecular film 41 is produced by the same method as that of the first molecular film 35. On this second molecule accumulated film 41, wirings 42-1 to 42-n, 43-1 to 43-n comprising two semi-transparent aluminum per one neuron are produced not to overlap with the output electrode 34 and the input electrode 33 of the neuron 31 arranged in the column direction (longitudinal direction in the figure).

The device will operate as follows.

For example, the juncture of the output of the neuron 31-11 at the left upper of FIG. 5, that is the cross points of the first row and the first column and the input of the neuron 31-mn at the right lower, that is the cross point of the m-th row and the n-th column is conducted as follows. A plurality of lights are irradiated to the portion where the electrode and the wiring of the neuron of FIG. 5 are crossed. For example, when a light is irradiated to the juncture portion 38-11 of the output electrode 34-11 of the neuron 31-11 of the first row and the first column and the juncture portion 38-11 of the first output wiring 39-1 produced at the first molecular film 36, the output electrode 34-11 and the first output wiring 39-1 are made conductive through the first molecular film 36, and the output information comprising an electric signal appeared at the output electrode 34-11 are handed out to the first output wiring 39-1. Next, when light is irradiated to the juncture portion 44-ln of the first output wiring 39-1 and the second output wiring 43-n on the second molecular film 41, the first output wiring 39-1 and the second output wiring 43-n are made conductive through the second molecular film 41, and the output information of the neuron 31-11 handed out to the first output wiring 39-1 are handed out to the second output wiring 43-n. Then, when light is irradiated to the juncture portion 45-mn between the second output wiring 43-n and the first input wiring 37-m produced on the first molecular film 36 and transverse the input electrode 33-mn connected to the neuron 31-mn of m-th row and n-th column, the second output wiring 43-n and the first input wiring 37-n are made conductive through the first molecular film 36, and the output information of the neuron 31-11 are handed out to the first input wiring 37-n. When light is irradiated onto the juncture portion 40-mn at which the first input wiring 37-n and the input electrode 33-mn connected to the neuron 31-mn of the m-th row and the n-th column cross with each other, the first input wiring 37-m and the input electrode 33-mn are made conductive through the first molecular film 36, and the output information of the neuron 31-11 of the first row and the first column can be handed out to the input node of the neuron 31-mn of the m-th row and the n-th column.

Therefore, by irradiating light to the above-described four juncture portions 31-11, 44-ln, 45-mn, and 40-mn at the same time, the output of the first row and first column neuron 31-11 and the input of the m-th row and the n-th column of the neuron 31-mn can be junctioned. Such juncture relation can be applied to between other neurons, enabling a representation of input/output juncture of all neurons.

Figure 8:
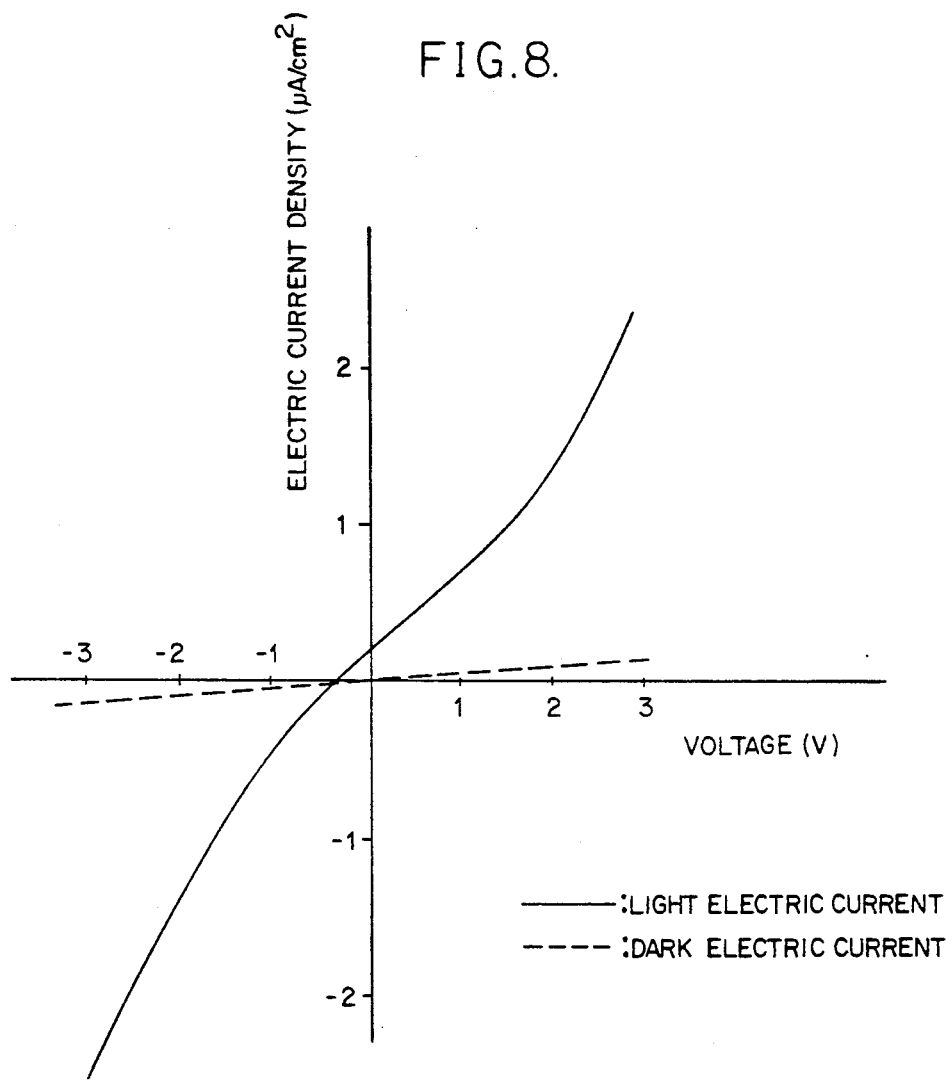
FIG. 8 is a diagram showing an example of characteristics of photoconductivity of the molecular film 25 of the first embodiment and the second molecular films 36 and 41 of the second embodiment.

FIG. 8 is a diagram showing an example of characteristics of photoconductivity of the molecular film 25 of the first embodiment and the second molecular films 36 and 41 of the second embodiment.

Next, the neuron number and the wiring number are compared in case of the above-described first and second embodiments and the prior art method that neurons and $T_{ij}$ are produced on the silicon LSI. In the prior art method, against the neuron of $N^2$, wirings of $N^2(N^2-1)$ are required. On the other hand, in the neuron arrangement and wiring of the first embodiment, $N^2$ pieces of input wirings 23 are required for $N^2$ pieces of neurons, and also $N^2$ pieces of output wirings 28 are required, and therefore total wiring number of $2N^2$ is required.

In the matrix type array of the neuron and the wiring produced thereon of the second embodiment, 2N pieces of first layer wirings which become first input and output wirings are required for $N^2(N \times N)$ pieces of neurons and also 2N pieces of second layer wirings which are second input and output wirings are required. That is, the total wiring number becomes 4N.

In a case of N=1, the total wiring number in the first embodiment is 2, and the total wiring number in the second embodiment is 4, the wiring number is enough to be small in the first embodiment. But in a case of N=2, the total wiring number of both becomes the same, and in a case of N≧3, as the N increases, the total wiring number in the second embodiment becomes less.

TABLE 1

| N | The number of neuron $N^2$ | Prior art method $N^2(N^2-1)$ | first embodiment $2N^2$ | second embodiment 4N |
|---|---|---|---|---|
| 1 | 1 | | 2 | 4 |
| 2 | 4 | 12 | 8 | 8 |
| 3 | 9 | 72 | 18 | 12 |
| 4 | 16 | 240 | 32 | 16 |
| 5 | 25 | 600 | 50 | 20 |
| . | . | . | . | . |
| . | . | . | . | . |
| 10 | 100 | 9,900 | 200 | 40 |
| . | . | . | . | . |
| . | . | . | . | . |
| 20 | 400 | 159,600 | 800 | 80 |
| . | . | . | . | . |
| . | . | . | . | . |
| 50 | 2500 | 6,247,500 | 5000 | 200 |
| . | . | . | . | . |
| . | . | . | . | . |

As discussed above, in the first and second embodiments, the information processing element is constituted to be provided with the semiconductor integrated circuit portion simulating a neuron function of a neural network, a light-electricity conversion function provided on the integrated circuit portion and a molecular film element to which the synapse juncture $T_{ij}$ of the plurality of neuron circuit regions is written in by the light provided in the integrated circuit portion. Therefore, it is possible to write in the $T_{ij}$ matrix arbitrarily, and also it reduces the wiring number, a high efficiency information processing is accomplished and the integration density of neuron is enhanced.

Figure 9:
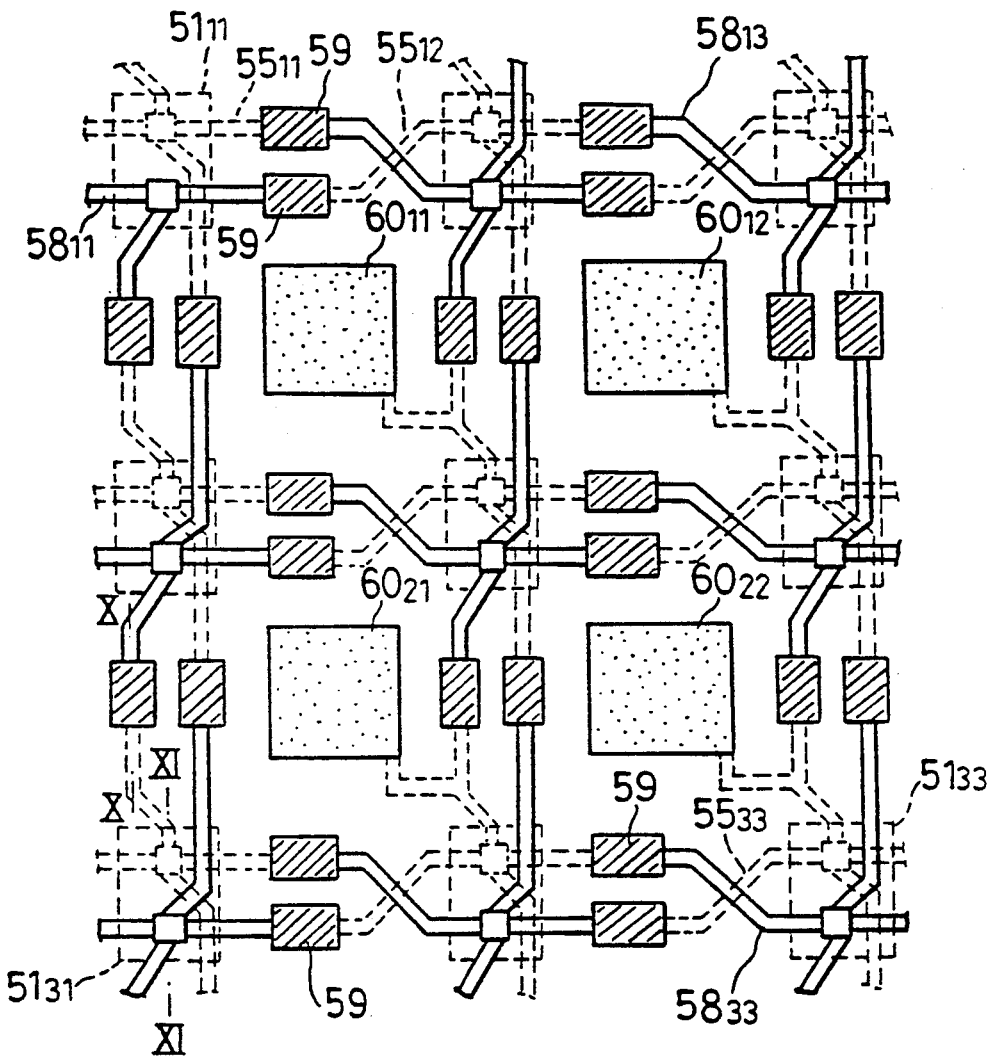
FIGS. 9, 10 and 11 show a third embodiment of the present invention.
Figure 10:
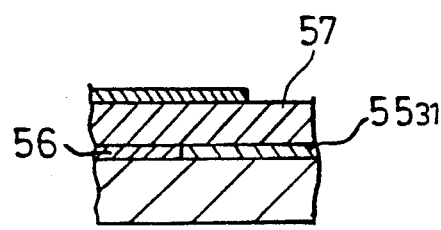
Figure 11:
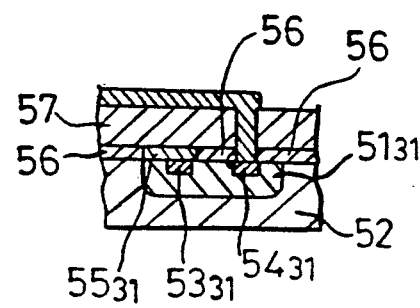

FIGS. 9 to 11 show a third embodiment of the present invention. In view of explanation, nine neurons and four image input portions produced on a substrate are shown. In FIGS. 9 to 11, reference numerals 51-11 to 51-33 designate neurons produced on the surface of the substrate 52 in a matrix array and these have the same construction as the neuron 21 shown in the first embodiment. Reference numerals 53-11 to 53-33 designate input nodes of the neurons 51-11 to 51-33. Reference numerals 54-11 to 54-33 designate output nodes of the neurons 51-11 to 51-33. Reference numerals 55-11 to 55-33 designate input wirings connected to the input nodes 53-11 to 53-33 of the corresponding neurons 51-11 to 51-33, produced on the surface of the substrate 52 via an insulating film (not shown), and these constitute approximately cross configuration extending up to the intermediate position of the adjacent neurons with the connected input nodes as a center. Furthermore, it has a wide width juncture portion at the respective end portion and has an input information portion connected to the lower electrode of the image input portion. Reference numeral 56 designates an insulating film comprising such as oxide film produced on the surface of the substrate 52 between the input wirings 53-11 to 53-33, and these are produced so as to have the surface which is flush with the surface of the input wirings 53-11 to 53-33. Reference numeral 57 designate a molecular film produced in contact with the surface of the insulating film, the surface of the input wirings 55-11 to 55-33, and the surface of the lower electrode of the image input portion, and this is the same as the molecular film 25 shown in the first embodiment. Reference numerals 58-11 to 58-33 designate output wirings connected to the output nodes of the corresponding neurons 51-11 to 51-33, produced in contact with the surface of this molecular film 57, and these output wirings constitute approximately cross configuration extending up to the intermediate position of the adjacent neurons with the connected input node as a center. These output wirings have a juncture portion of wide width confronting to the juncture portion of the input wirings 53-11 to 53-33 connected to the input nodes of the adjacent neurons at the respective end thereof, and these are produced of conductive material which transmits the light, such as semi-transparent aluminum produced thin. By the juncture portion of this output wiring, the juncture portion of the input wirings confronting thereto, and the molecular film 25 existing between the both juncture portions, a synapse juncture portion 59 to which $T_{ij}$ signal representing the degree of synapse juncture of the input and output of the adjacent neurons is input is produced, and light is incident to this synapse juncture portion 59 thereby to arise a change in the electric conductivity of the molecular film 25 representing a $T_{ij}$ signal. Reference numerals 60-11 to 60-22 designate upper electrodes of the image input portion produced in contact with the surface of the molecular film 25 of the region surrounded by the adjacent four neurons, and a predetermined voltage is given thereto. At the lower portion where upper electrodes 60-11 to 60-22 are confronting, a lower electrode in contact with the surface of the molecular film 57 via an insulating film on the surface of the substrate 52 is produced, an image input portion is constituted by the upper electrode and the lower electrode and the molecular film 57 existing between the both electrodes, and when light is irradiated to the upper electrode, the electric conductivity of the molecular film below the irradiated upper electrode varies and a current in accordance with the intensity of the incident light flows from the upper electrode through the molecular film 57 to the lower electrode, and this current flows to the neuron connected to the lower electrode, representing an input information against the neuron.

A description is given of the production method of this third embodiment. First of all, neurons 51-11 to 51-33 are produced in a matrix utilizing an integrated circuit technique on the surface of the substrate 52. Then, required circuit elements are produced at the same time as a peripheral circuit. Next, an insulating film is produced at the surface of the substrate 52 including a neuron, and a contact hole is opened at a position of the input electrodes 53-11 to 53-33 of the neurons 51-11 to 51-33 of this insulating film. Aluminum is vapor deposited on the entire surface of this insulating film, and an etching is executed using a mask of a predetermined pattern by photolithography technique to produce input wirings 55-11 to 55-33 and lower electrode of image input portion. Next, an insulating film 56 is produced on the surface of the substrate 52 between the input wirings 55-11 to 55-33 and the lower electrode, and the surface of the insulating film 56 is flush with the surface of the input wirings 55-11 to 55-33 and the lower electrode. In contact with the surface of the input wirings 55-11 to 55-33 and the lower electrode and the surface of the insulating film 56, a molecular film 57 is produced in a similar manner as the molecular film 25 in the first embodiment. Next, a contact hole is produced at a position of the output electrodes 54-11 to 54-33 of the neurons 51-11 to 51-33 in the molecular film 57 and the insulating film 56 therebelow, and thereafter aluminum is vapor deposited on the surface of the molecular film 57, an etching is executed using a mask of a predetermined pattern by the photolithography technique, to produce output wirings 58-11 to 58-33 and upper electrodes 60-11 to 60-22 of the image input portions. Although these output wirings 58-11 to 58-33 and upper electrodes 60-11 to 60-22 are made semi-transparent aluminum film with making the thickness thereof thin, these may be produced by a transparent conductive layer such as ITO or neso-silicate glass.

Next, a description is given of the operation of this third embodiment.

First of all, in order to obtain a desired synapse juncture $T_{ij}$ between the neurons 51-11 to 51-33, light of the intensity in accordance with the synapse juncture $T_{ij}$ is irradiated to the respective synapse juncture portion 59 between the juncture portion of the input wirings 55-11 to 55-33 and the output wirings 58-11 to 58-33. When light on the bases of the image information is irradiated to the position of the upper electrode 60-11 to 60-33 of the image input portion in this state, an electric conductivity in accordance with the intensity of the light is obtained at the molecular film 57 at the lower portion of the upper electrodes 60-11 to 60-33. As a result, a current flows from the upper electrodes 60-11 to 60-33 to the lower electrode in accordance with the electric conductivity of the molecular film 57, an image information is input to the neurons 51-11 to 51-33 via the input wirings 55-11 to 55-33. On the other hand, the output of the neuron 51-11 to 51-33 becomes input of the neuron 51-11 t 51-33 through the synapse juncture portion 59 in accordance with the synapse juncture $T_{ij}$ through the output wirings 58-11 to 58-33. When the output of the neurons 51-11 to 51-33 is made stable as a whole network, information which is most appropriate is output.

In this third embodiment, one layer of molecular film having a light-electricity conversion function is used. Therefore, in this case there is limitations in the picture number and the wiring number. In order to solve these, the molecular film portion ma be made of multilayer structure.

FIGS. 12 to 15 shows an example in a case where the molecular film portion is made of a two-layer structure.

In FIGS. 12 to 15, reference numerals 71-11 to 71-mn designate neurons produced arranged in a matrix of m rows and n columns on the surface of the semiconductor substrate 72, and these has the same constitution as the neuron 21 shown in the first embodiment. Reference numerals 73-11 to 73-mn designate input electrodes connected to the input nodes of the neurons 71-11 to 71-mn, and these are produced by a vacuum deposition of aluminum. Reference numerals 74-11 to 74-mn designate output electrodes connected to the output nodes of the neurons 71-11 to 71-mn, and these are produced by vacuum deposition of aluminum. Reference numerals 75-11 to 75-mn designate lower electrodes of the image input portions 76-11 to 76-mn connected to the input electrodes of the corresponding neurons produced on the surface of the substrate 72 surrounded by the adjacent four neurons via an insulating film (not shown), and these are produced by vacuum deposition of aluminum. Reference numeral 77 designates an insulating film comprising such a an oxide film produced between the input electrodes 73-11 to 73-mn and output electrodes 74-11 to 74-mn on the surface of the substrate 72. Reference numeral 78 designates a first molecular film produced in contact with the surface of the insulating film and the surface of the input and output electrodes 73-11 to 73-mn, 74-11 to 74-mn and the lower electrodes 75-11 to 75-mn, and this is the same as the molecular film 25 shown in the first embodiment. Reference numerals 79-1 to 79-m designate first input wiring arranged confronting to the input electrode produced at the corresponding rows, in contact with the surface of the first insulating film 78 and produced in parallel with each row, and these are produced by vacuum deposition of aluminum and is made in a semi-transparent state which transmits the light, and when light is irradiated to the juncture portion 80-11 to 80-mn which are the position confronting to the input electrode, this is electrically connected to the input electrode via the first molecular film 78. Reference numerals 81-1 to 81-m designate first output wirings arranged confronting to the output electrode which is produced at corresponding row, produced on the surface of the first molecular film 78 in parallel with each row, and these are produced by vacuum deposition of aluminum at the same time as the first input wirings 79-11 to 79-m, and when light is irradiated to the juncture portions 82-11 to 82-mn which are the portions confronting to the output electrode, these are electrically connected with the output electrode via a first molecular film 78, and transmit output information to the output portion (not shown). Reference numerals 83-11 to 83-mn designate upper electrodes of the image input portions 76-11 to 76-mn produced at the surface of the first molecular film 78 confronting to the lower electrodes 75-11 to 75-mn, and these are produced by vacuum deposition of aluminum at the same time as the first input and output wiring, and when light of image input information is irradiated to a portion confronting to the lower electrode, an input information is given to the lower electrode by the electric conductivity of the first molecular film 78 in accordance with the intensity of the light, and this is connected to a predetermined voltage point. Reference numeral 84 designates a second molecular film produced in contact with the surface of the first molecular film 78, the first input wirings 79-1 to 79-m, the first output wirings 81-1 to 81-m and the upper electrode 83-11 to 83-mn, and these are ones the same as the first molecular film 78. Reference numerals 85-1 to 85-n designate second input wirings for transmitting the input information from the input portion (not shown), produced in parallel with each column in contact with the surface of the second molecular film 84, and these are produced by vacuum deposition of aluminum and are made of semi-transparent state which transmits the light, and when light is irradiated to the juncture portion which is a portion confronting to the first input wiring, these are electrically connected with the first input wiring via a second molecular film 85. If it is constituted such that the input information is directly input to the first input wirings 79-1 to 79-m, the second input wirings 85-1 to 85-n are not necessarily required. Reference numerals 86-1 to 86-n designate second output wirings produced in parallel with each row in contact with the surface of the second molecular film 85, and these output wirings are produced by vacuum deposition of aluminum at the same time as the second input wirings 85-1 to 85-n, and when light is irradiated to the juncture portions 87-11 to 87-mn which are portions confronting to the first output wirings 81-1 to 81-n and the juncture portions 88-11 to 88-mn confronting to the first input wirings 79-1 to 79-m, these are electrically connected with the first output wirings and the first input wirings via a second molecular film 84.

A description is given of a production method of this fourth embodiment.

Neurons 71-11 to 71-mn constituted by an analogue electronic circuits simulating the neuron operation of a living body are arranged in a matrix array of m rows and n columns on the surface of the silicon substrate 72 utilizing an integrated circuit technique. Next, an insulating film such as oxide film is produced on the entire surface of the substrate 72, and a contact hole is produced at a portion of the input and the output nodes of the neurons 71-11 to 71-mn, and thereafter, by vacuum deposition and photolithography technique, input and output electrodes 73-11 to 73-mn, 74-11 to 74-mn which are connected to the input and the output nodes of the neurons 71-11 to 71-mn and the lower electrodes 75-11 to 75-mn are produced. On the surface of the substrate 72 on which these electrodes are not produced the surface is flattened by the insulating film 77 such as $SiO_2$ film. Next, in contact with the surface of the insulating film 77, the electrodes 73-11 to 73-mn, 74-11 to 74-mn, 75-11 to 75-mn, a first molecular film 78 is produced in a similar manner as in the first embodiment on a wafer by Langmuir-Blodgett's technique. So as to transverse directly above the output electrode of the neuron arranged in the row direction (in the figure, transverse direction) on the first molecular film 78 and directly above the input electrode, first input and output wiring 79-1 to 79-m, 81-1 to 81-m comprising semi-transparent aluminum are produced. At the same time upper electrodes 83-11 to 83-mn of semi-transparent aluminum are produced confronting to the lower electrode 75-11 to 75-mn. A second molecular film 84 is produced thereon by the same method as that of the first molecular film 78. Second input and output wirings 85-1 to 85-n, 86-1 to 86-n are produced by semi-transparent aluminum per one neuron so that they do not overlap the output electrode and the input electrode of the neuron arranged in the column direction (in the figure longitudinal direction) on the second molecular accumulating film 84.

The device will operate as follows.

Figure 12:
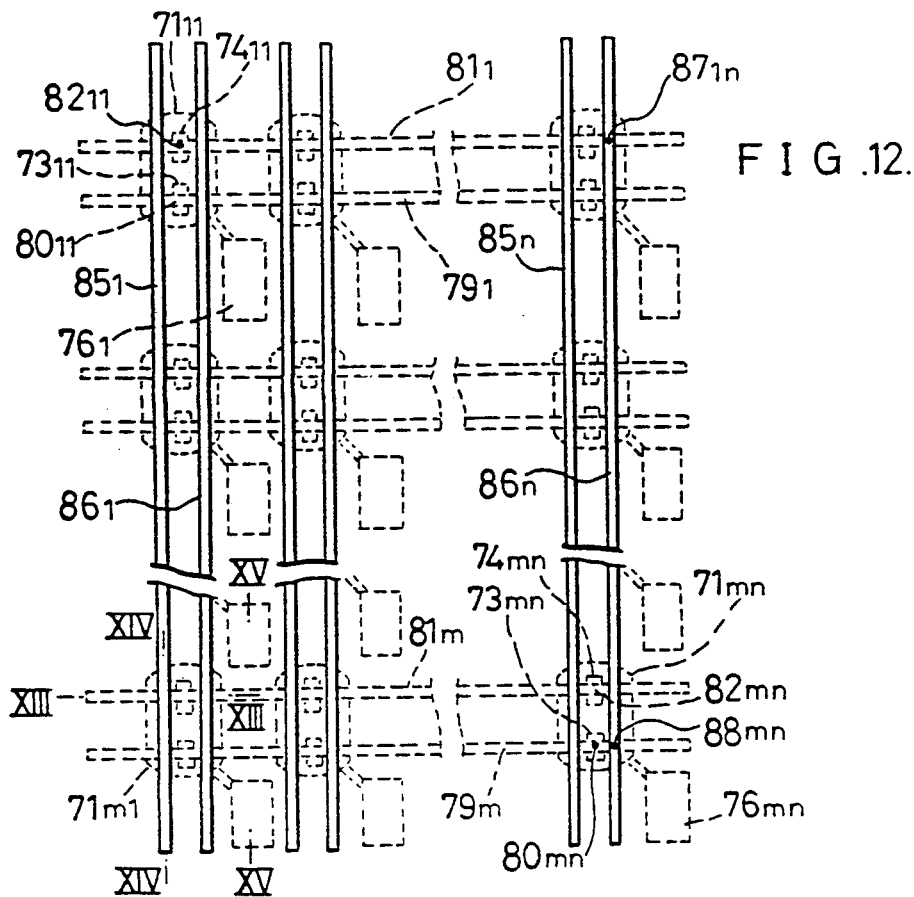
FIGS. 12 13, 14 and 15 show an example in a case where the molecular film portion is made of a two-layer structure.
Figure 13:
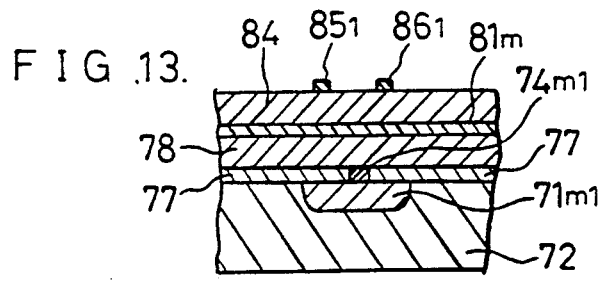
Figure 14:
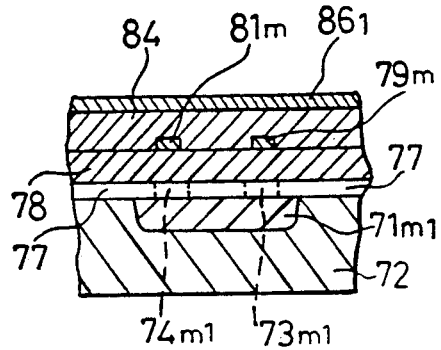
Figure 15:
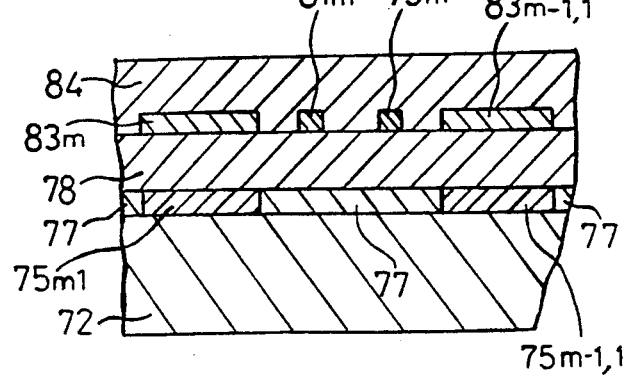

The juncture between the output of the first row first column neuron 71-11 at the left and upper part of FIG. 12 and the input of the m-th row and n-th column neuron 71-mn at the right and lower part of FIG. 12 is conducted as follows. A plurality of lights are irradiated to the portion where the electrodes of the neuron and the wirings are crossing with each other in FIG. 12. For example, when the light is irradiated to the juncture portion 82-11 of the output electrode 73-11 of the left and upper neuron 71-11 and the first output wiring 81-1 produced on the first molecular film 78, the output electrode 73-11 and the first output wiring 81-1 are made conductive through the first molecular film 78, and the electric signal of the output electrode is handed out to the first output wiring 81-1. Next, when light is irradiated to the juncture point 87-lm of the first output wiring 81-1 and the second output wiring 86-n, the first output wiring 81-1 and the second output wiring 86-n are made conductive through the second molecular film 84, and the electric signal which is an output information from the neuron 71-11 which is handed out to the first output wiring 81-1 is handed out to the second output wiring 86-n. Then, when light is irradiated to the juncture point 73-mn between the second output wiring 86-n and the first input wiring 79-m, the second output wiring 86-n and the first input wiring 79-m are made conductive through the second molecular film 84, and the electric signal as an output information from the neuron 71-11 is handed out to the first input wiring 79-m.

Finally, when light is irradiated to the juncture portion 80-mn between the first input wiring 79-m and the input electrode 73-mn of the m-th row and the n-th column neuron 71-mn, the first input wiring 79-m and the input electrode 73-mn are made conductive through the first molecular film 78, and the electric signal which is an output information from the first row first column neuron 71-11 is handed out to the input electrode 73-mn of the m-th row and n-th column neuron 71-mn.

In this way, by irradiating light to the four juncture portions 82-11, 87-ln, 88-mn, and 80-mn at the same time, the output of the first row and first column neuron 71-11 can be junctioned to the input of the m-th row and n-th column neuron 71-mn. Such juncture relation can be applied to between the other neurons, enabling a representation of input/output combination of all neurons.

Figure 16:
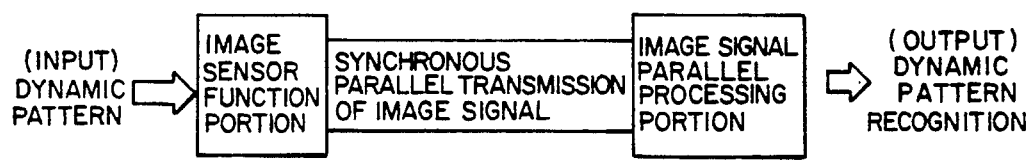
FIG. 16 is a block diagram showing a visual information processing system constituted by visual information processing elements according to the third and fourth embodiments as a function block.

FIG. 16 is a block diagram showing a visual information processing system constituted by visual information processing elements according to the third or fourth embodiment as a function block. As shown in FIG. 16, by using the visual information processing elements according to the third or fourth embodiments, a visual information processing system capable of conducting parallel information processing is realized.

Herein, in constituting a visual information processing system, if a molecular film having a light-electricity conversion function of wide electroscopic sensitivity wavelength band is used for the molecular film element, by irradiating light of different wavelength to the visual image signal and $T_{ij}$ signal, thereby to obtain a desired $T_{ij}$, and thus, a visual information processing system conducting a high speed visual information processing is realized.

Other than a system in which the $T_{ij}$ signal is irradiated from the outside, a system in which such as photodiodes are integrated in the semiconductor integrated circuit element portion so as to enable to irradiate the molecular film element may be used.

As discussed above, according to the third and fourth embodiments, an image sensor portion and $T_{ij}$ portion are constituted by a molecular film portion having a light-electricity conversion function, and a molecular film is constituted in a multilayer on the semiconductor integrated circuit of the neuron portion in three dimensional, therefore, it is possible to have a function of image sensor and a function of a neuron in the same element and further capable of writing the $T_{ij}$ signal from the outside. As a result, the visual image signal from the image sensor portion can be handed out in parallel to the neuron which is a neural information processing function portion, and further, a neural information processing having a high degree of $T_{ij}$ function is enabled to realize a super high speed visual information processing element.

What is claimed is:

1. An information processing element comprising:
    a semiconductor integrated circuit element comprising an N ×M matrix of neuron circuit regions, each neuron circuit region having an input and an output electrode;
    a first heterojunction molecular film having photoconductive characteristics and disposed on said semiconductor integrated circuit element;
    2N pieces of first semi-transparent wirings provided on said first heterojunction molecular film in a transverse direction to transverse the output electrodes or the input electrodes of a plurality of said neuron circuit regions to form a plurality of first cross points;
    a second heterojunction molecular film having photoconductive characteristics and disposed on said first heterojunction molecular film on which said first semi-transparent wirings are provided; and
    2M pieces of second semi-transparent wirings provided on said second heterojunction molecular film in a longitudinal direction to transverse the output electrodes or the input electrodes of a plurality of said neuron circuit regions and to form a plurality of second cross points;
    said 2N pieces of first semi-transparent wirings at least partially disposed intermediate said first and second heterojunction molecular films;
    the first cross points and the second cross points being responsive to light so that intensity $(T_{ij})$ at a juncture between said N×M neuron circuit regions is controllable.

2. A visual information processing element conducting processing of visual information having a neural network function, comprising:
    a semiconductor integrated circuit element comprising an N ×M matrix of neuron circuit regions, each neuron circuit region having an input electrode and an output electrode;
    a first heterojunction molecular film having photoconductive properties and disposed on said semiconductor integrated circuit element;
    2N pieces of first semi-transparent wirings provided on said first heterojunction molecular film in a transverse direction to transverse the output electrodes or the input electrodes of M neuron circuit regions;
    a second heterojunction molecular film having photoelectric properties and disposed on said first heterojunction molecular film on which said first semi-transparent wirings are provided; and
    2M pieces of second semi-transparent wirings provided on said second heterojunction molecular film in a longitudinal direction to transverse the output electrodes or the input electrodes of a plurality of said circuit regions;
    said 2N pieces of first semi-transparent wirings at least partially disposed intermediate said first and second heterojunction molecular films;
    the cross point between the output electrode or the input electrode of each of said neuron circuit regions and said first semi-transparent wiring, sand the cross point between the first semi-transparent wiring and the second semi-transparent wiring being responsive to light so that the intensity at the juncture $(T_{ij})$ between said N×M pieces of neuron circuit regions is controllable.

3. An information processing element comprising:
    a semiconductor integrated circuit element having a plurality of neuron circuit regions, each of said neuron circuit regions having an input electrode and an output electrode, said neuron circuit regions arranged into a matrix configuration;
    a first heterojunction molecular film having photoconductive characteristics and disposed on said semiconductor integrated circuit element;
    a first plurality of semi-transparent electrical conductors disposed on said first heterojunction molecular film in a first direction so as to transverse the output electrodes or the input electrodes of at least one neuron circuit region to form a first crossing point;

a second heterojunction molecular film having photoconductive characteristics and disposed on said first heterojunction molecular film and said first plurality of semi-transparent electrical conductors;

a second plurality of semi-transparent electrical conductors disposed on the second heterojunction molecular film in a second direction so as to transverse the output electrodes or the input electrodes of the neuron circuit regions to form a second crossing point;

the first crossing point and second crossing point being sensitive to light to control the intensity at the juncture between the neuron circuit regions; and a plurality of image sensor elements, each image sensor element coupled to one of said neuron circuit regions, said image sensor elements being responsive to a visual image signal having a first wavelength, while said first and second crossing points are simultaneously responsive to light of a second wavelength for controlling the juncture intensity between said neuron circuit regions.

4. The information processing element of claim 3 wherein the matrix of neuron circuit regions comprises an N×M matrix of neuron circuit regions, where N and M are integers.

5. The information processing element of claim 4 wherein the first plurality of semi-transparent electrical conductors comprises 2N semi-transparent electrical conductors which transverse N neuron circuit regions.

6. The information processing element of claim 5 wherein the second plurality of semi-transparent electrical conductors comprises 2M semi-transparent electrical conductors which transverse, in the second direction, N neuron circuit regions, each of the 2M semi-transparent electrical conductors transversing at least two portions of a neuron circuit region.

7. The information processing element of claim 3 wherein each of said image sensor elements comprise:
a lower electrode produced on the surface of said semiconductor substrate and connected to the input electrode of one of said neuron circuit regions;
a photoelectric juncture layer coupled to the lower electrode and selected of the first plurality of semi-transparent electrical conductors; and
an upper electrode coupled to the lower electrode.

8. The information processing element of claim 7 wherein the photoelectric juncture layer of said image sensor elements comprises a portion of the first heterojunction molecular film.

9. The information processing element of claim 3 wherein one of the first and second heterojunction molecular films comprises organic molecules.

10. The information processing element of claim 9 wherein one of the first and second heterojunction molecular films comprises a layer of polyphirin derivative having a layer of flavine derivative disposed thereon.

11. An information processing element comprising:
a semiconductor integrated circuit element having a plurality of neuron circuit regions, each of said neuron circuit region having an input electrode and an output electrode, said neuron circuit regions arranged into a matrix configuration;

a first heterojunction molecular film having photoconductive characteristics and disposed on said semiconductor integrated circuit element;

a first plurality of semi-transparent electrical conductors disposed on said first heterojunction molecular film in a first direction so as to transverse the output electrodes or the input electrodes of at least one neuron circuit region to form a first crossing point;

a second heterojunction molecular film having photoconductive characteristics and disposed on said first heterojunction molecular film and said first plurality of semi-transparent electrical conductors; and a second plurality of semi-transparent electrical conductors disposed on the second molecular film in a second direction so as to transverse the output electrodes or the input electrodes of a plurality of the neuron circuit regions to form a second crossing point;

the first crossing point and second crossing point being sensitive to light to control the intensity of the juncture between the neuron circuit regions.

12. The information processing element of claim 11 wherein the matrix of neuron circuit regions comprises an N×M matrix of neuron circuit regions, where N and M are integers.

13. The information processing element of claim 12 wherein the first plurality of semi-transparent electrical conductors comprises 2N semi-transparent electrical conductors which transverse N neuron circuit regions.

14. The information processing element of claim 13 wherein the second plurality of semi-transparent electrical conductors comprises 2M semi-transparent electrical conductors which transverse, in the second direction, N neuron circuit regions, each of the 2M semi-transparent electrical conductors transversing at least two portions of a neuron circuit region.

15. The information processing element of claim 11 further in combination with a plurality of image sensor elements, each image sensor element coupled to one of said neuron circuit regions.

16. The information processing element of claim 15 wherein each of said image sensor elements comprise:
a lower electrode produced on the surface of said semiconductor substrate and connected to the input electrode of one of said neuron circuit regions;
a photoelectric juncture layer coupled to the lower electrode and selected of the first plurality of semi-transparent electrical conductors; and
an upper electrode coupled to the lower electrode.

17. The information processing element of claim 16 wherein the photoelectric juncture layer of said image sensor elements comprises a portion of the first heterojunction molecular film.

18. The information processing element of claim 17 wherein said image sensor elements are responsive to a visual image signal having a first wavelength while said first and second crossing points are simultaneously responsive to light of a second wavelength for controlling the intensity at the juncture between said neuron circuit regions.

19. The information processing element of claim 11 wherein one of the first and second heterojunction molecular films comprises organic molecules.

20. The information processing element of claim 19 wherein one of the first and second heterojunction molecular films comprises a layer of polyphirin derivative having a layer of flavine derivative disposed thereon.

* * * * *